United States Patent
Ziegler et al.

(10) Patent No.: US 11,808,896 B2
(45) Date of Patent: Nov. 7, 2023

(54) METHOD AND DEVICE FOR CALIBRATING A VEHICLE SENSOR

(71) Applicant: Robert Bosch GmbH, Stuttgart (DE)

(72) Inventors: David Ziegler, Stuttgart (DE); Stephan Dorenkamp, Esslingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 545 days.

(21) Appl. No.: 17/072,303

(22) Filed: Oct. 16, 2020

(65) Prior Publication Data

US 2021/0124034 A1    Apr. 29, 2021

(30) Foreign Application Priority Data

Oct. 24, 2019  (DE) .......................... 102019216396.3

(51) Int. Cl.
  *G01S 7/497* (2006.01)
  *G01S 7/40* (2006.01)
  *G01S 17/42* (2006.01)
  *G01S 1/42* (2006.01)

(52) U.S. Cl.
  CPC .............. *G01S 7/4972* (2013.01); *G01S 1/42* (2013.01); *G01S 7/40* (2013.01); *G01S 7/403* (2021.05); *G01S 7/4086* (2021.05); *G01S 7/4091* (2021.05)

(58) Field of Classification Search
  CPC .......... G01S 7/4972; G01S 7/40; G01S 17/42; G01S 7/4086; G01S 7/4091; G01S 7/403
  See application file for complete search history.

(56) References Cited

U.S. PATENT DOCUMENTS

| | | | | |
|---|---|---|---|---|
| 3,069,654 A | * | 12/1962 | Hough | G06V 10/48 |
| | | | | 382/202 |
| 5,964,822 A | * | 10/1999 | Alland | G01S 15/42 |
| | | | | 701/96 |
| 9,348,017 B2 | * | 5/2016 | Steinlechner | G01S 7/40 |
| 10,269,141 B1 | * | 4/2019 | Shotan | H04N 25/61 |

(Continued)

FOREIGN PATENT DOCUMENTS

| | | |
|---|---|---|
| DE | 102013209494 A1 | 11/2014 |
| EP | 1947473 A2 | 7/2008 |
| WO | WO-2018217708 A1 * | 11/2018 ........... G01S 13/589 |

*Primary Examiner* — Isam A Alsomiri
*Assistant Examiner* — Joseph C Fritchman
(74) *Attorney, Agent, or Firm* — NORTON ROSE FULBRIGHT US LLP; Gerard Messina

(57) ABSTRACT

A method for calibrating a vehicle sensor of a motor vehicle. The method includes: ascertaining sensor data for a plurality of measuring points in time during a total measuring time period, the total measuring time period being subdivided into partial measuring time periods, and the motor vehicle moving relative to objects in surroundings of the motor vehicle; for each partial measuring time period, computing positions of the objects based on the ascertained sensor data; for each partial measuring time period, computing a partial measuring time period sinogram based on the computed positions; computing a total measuring time period sinogram by adding the partial measuring time period sinograms and correcting using a factor that is a function of the partial measuring time period sinograms; ascertaining an orientation of the vehicle sensor based on the total measuring time period sinogram; and calibrating the vehicle sensor based on the ascertained orientation.

10 Claims, 5 Drawing Sheets

(56) References Cited

U.S. PATENT DOCUMENTS

| | | | |
|---|---|---|---|
| 10,928,510 B1* | 2/2021 | Wood | G01S 13/867 |
| 2013/0229529 A1* | 9/2013 | Lablans | H04N 23/698 |
| | | | 348/169 |
| 2014/0043436 A1* | 2/2014 | Bell | H04N 13/204 |
| | | | 348/46 |
| 2014/0378171 A1* | 12/2014 | Rudow | G01S 19/49 |
| | | | 455/456.6 |
| 2015/0177370 A1* | 6/2015 | Trummer | G01S 7/51 |
| | | | 356/5.01 |
| 2017/0032526 A1* | 2/2017 | Gao | G06T 7/246 |
| 2020/0057488 A1* | 2/2020 | Johnson | G06T 17/00 |
| 2020/0209369 A1* | 7/2020 | Koch | G01S 7/4972 |
| 2021/0004610 A1* | 1/2021 | Huang | G01S 7/497 |

* cited by examiner

METHOD AND DEVICE FOR CALIBRATING A VEHICLE SENSOR

CROSS REFERENCE

The present application claims the benefit under 35 U.S.C. § 119 of German Patent Application No. DE 102019216396.3 filed on Oct. 24, 2019, which is expressly incorporated herein by reference in its entirety.

FIELD

The present invention relates to a method for calibrating a vehicle sensor of a motor vehicle. Moreover, the present invention relates to a corresponding device for calibrating a vehicle sensor of a motor vehicle.

BACKGROUND INFORMATION

Driver assistance systems access sensor data of vehicle sensors. In order for the driver assistance systems to already be available upon leaving the factory, the vehicle sensors must be calibrated. For the calibration, the motor vehicle may be moved on a chassis stand toward a suitable target while measuring the travel axis. However, the stationary measurement of the travel axis and the calibration based thereon may be time-consuming and costly. In particular, ascertaining the orientation of the sensors in relation to the travel axis of the motor vehicle in the manufacturing environment may be problematic, since brief downtimes are to be expected. The complexity of static methods may thus increase linearly with each sensor, which may prove to be difficult for a multisensor system made up of numerous sensors.

During a dynamic calibration of the sensors with the aid of trilateration via stationary objects, it may be difficult to monitor the positions of the objects relative to one another in order to ensure that the object is not moved. Tracking of objects is also very complicated. An "object" may be understood to mean any point that may be assigned coordinates based on the sensor data, such as radar reflections or the like.

A method for ascertaining an adjustment of a radar sensor is described in German Patent Application No. DE 10 2013 209 494 A1, in which measured angles are compared to computed angles, based on a distance measurement.

In addition, a method and a measuring section for aligning a distance sensor are described in European Patent Application No. EP 1 947 473 A2, in which a line pole is situated on a roadway.

SUMMARY

The present invention provides a method for calibrating a vehicle sensor of a motor vehicle, and a device for calibrating a vehicle sensor of a motor vehicle.

Preferred specific embodiments of the present invention are described herein.

Thus, a first aspect the present invention relates to a method for calibrating a vehicle sensor of a motor vehicle. In accordance with an example embodiment of the present invention, the vehicle sensor ascertains sensor data for a plurality of measuring points in time during a total measuring time period, the motor vehicle moving relative to objects in the surroundings of the motor vehicle. The total measuring time period is subdivided into a plurality of partial measuring time periods.

For each partial measuring time period, object positions are computed based on the ascertained sensor data. For each partial measuring time period, a partial measuring time period sinogram is computed based on the computed object positions for the partial measuring time period. A total measuring time period sinogram is computed by adding the partial measuring time period sinograms and by correcting with the aid of a factor that is a function of the partial measuring time period sinograms. An orientation of the vehicle sensor relative to a travel axis of the motor vehicle is ascertained based on the total measuring time period sinogram. The vehicle sensor is calibrated based on the ascertained orientation of the vehicle sensor relative to the travel axis of the motor vehicle.

According to a second aspect, the present invention relates to a device for calibrating a vehicle sensor of a motor vehicle, including an interface, a processing device, and a calibration device. In accordance with an example embodiment of the present invention, the interface receives sensor data that have been ascertained by the vehicle sensor for a plurality of measuring points in time during a total measuring time period while the motor vehicle is moving relative to objects in the surroundings of the motor vehicle. The processing device subdivides the total measuring time period into a plurality of partial measuring time periods. For each partial measuring time period, the processing device computes object positions based on the ascertained sensor data. For each partial measuring time period, the processing device computes a partial measuring time period sinogram based on the computed object positions for the partial measuring time period. The processing device computes a total measuring time period sinogram by adding the partial measuring time period sinograms and by correcting with the aid of a factor that is a function of the partial measuring time period sinograms. The processing device also computes an orientation of the vehicle sensor relative to a travel axis of the motor vehicle, based on the total measuring time period sinogram. The calibration device calibrates the vehicle sensor based on the ascertained orientation of the vehicle sensor relative to the travel axis of the motor vehicle.

The present invention allows a dynamic calibration, so that the calibration operation may be carried out without downtimes and without aligning the travel axis during travel. Thus, for example, the trip from the factory to the parking facility or the transporter may be used for the calibration. The present invention may therefore be used to optimize the process timing in the factory.

The calibration of the vehicle sensor according to the present invention may also manage without measuring (radial) speeds, yaw rates, or further signals. In addition, tracking of the objects is not necessary. Furthermore, the method is more accurate than static methods, in particular in the elevation direction.

Lastly, the method is easier to implement. The method achieves good results even though it does not rely on fixed objects, so that costs may be reduced due to the fact that the objects do not have to be continuously monitored with regard to their placement position.

By subdividing the total measuring time period into a plurality of partial measuring time periods and ascertaining corresponding partial measuring time period sinograms, pronounced perturbations may be eliminated by using the correction factor. The correction factor may optionally also be zero if no correction is required. Possible perturbations include foreign structures such as curves, straight lines perpendicular to the movement direction, and the like. In particular, movement influences that act opposite the main flow direction, as well as spatial structures that adversely affect the computing of the sinograms, may be compensated for. The total measuring time period sinogram thus contains essentially only the main movement flow. The present invention thus allows a better determination of the main movement of the objects. In particular, short-term influences such as unevenness, braking and acceleration operations of the motor vehicle, and small steering angles may be compensated for. The compensation is advantageous in particular for a continuous compensation during travel, since many interference factors exponentially increase here which may be continuously filtered out.

Furthermore, static angle deviations that are caused by surfaces in front of the radar (covers, for example), through which the radar emits its radiation, may be corrected.

According to a further specific embodiment of the method for calibrating a vehicle sensor in accordance with the present invention, the vehicle sensor includes at least one radar sensor, a LIDAR sensor, an ultrasonic sensor, an infrared sensor, and/or a camera sensor. The present invention is applicable to all sensors that sample the surroundings, without additional outside information.

According to a further specific embodiment of the method for calibrating a vehicle sensor in accordance with the present invention, in addition a speed and a yaw rate of the vehicle are determined in order to carry out precise post-filtering of the orientation of the vehicle sensor relative to the travel axis of the motor vehicle, i.e., with respect to an orientation error angle in the azimuth direction and elevation direction.

According to a further specific embodiment of the method for calibrating a vehicle sensor in accordance with the present invention, the partial measuring time period sinograms are computed with the aid of a Hough transform.

According to a further specific embodiment of the method for calibrating a vehicle sensor in accordance with the present invention, for correcting with the aid of a factor that is a function of the partial measuring time period sinograms, the partial measuring time period sinograms are normalized. In addition, a difference sinogram is computed by multiplying the normalized partial measuring time period sinograms together. The difference sinogram may in turn be normalized.

The factor may be computed by subtracting the normalized difference sinogram from a sinogram having the value 1. This corresponds to a compensation of "background noise" due to movements and structures. A filtered flow determination that is compensated for interfering factors thus takes place.

According to a further specific embodiment of the method for calibrating a vehicle sensor in accordance with the present invention, a weighting of the object positions is carried out during creation of the partial measuring time period sinograms. The weighting may result in better results, since quality features of the object positions that are associated with the objects may be taken into account. Device information of the vehicle sensors may be taken into account for the weighting, in particular a range of the sensors or an angle dependency or distance dependency on the quality on the sensor data that are ascertained by the vehicle sensor. The more reliable the data, the more highly the corresponding pieces of information are weighted.

According to a further specific embodiment of the method for calibrating a vehicle sensor, a main direction of the object positions is ascertained within the Hough space, based on the total measuring time period sinogram, using methods that determine intensity maxima, in particular via kernel density estimation, the ascertainment of the orientation of the vehicle sensor relative to the travel axis of the motor vehicle including computing an angle between the main direction and the travel axis of the motor vehicle.

According to a further specific embodiment of the method for calibrating a vehicle sensor in accordance with the present invention, an azimuth angle and an elevation angle are computed which extend between corresponding main directions and the travel axis of the motor vehicle.

According to a further specific embodiment of the method for calibrating a vehicle sensor, the total measuring time period sinogram includes intensity values that are ascertained based on the sensor data, a histogram being computed with application of a threshold value function to the intensity values. The histogram is a function of an azimuth angle and/or elevation angle relative to the travel axis of the motor vehicle. The orientation of the vehicle sensor relative to the travel axis of the motor vehicle is ascertained based on the computed histogram.

According to a further specific embodiment of the method for calibrating a vehicle sensor in accordance with the present invention, the orientation of the vehicle sensor relative to the travel axis of the motor vehicle is ascertained by applying a filtering function to the histogram.

According to a further specific embodiment of the method for calibrating a vehicle sensor, a main direction of the object positions is ascertained by applying the filtering function to the histogram. The ascertainment of the orientation of the vehicle sensor relative to the travel axis of the motor vehicle includes computing an angle between the main direction and the travel axis of the motor vehicle.

According to a further specific embodiment of the method for calibrating a vehicle sensor in accordance with the present invention, the computing of the partial measuring time period sinograms is carried out in spherical coordinates. The computing preferably takes place without prior computation of a grid. The use of spherical coordinates has the advantage that the positions of the objects are often already present in spherical coordinates, so that they may be used without transformation into the Cartesian coordinate system. The performance may thus be increased. Expression in the spherical coordinate system allows greater accuracy which is comparable to the accuracy of a Radon transform, but which under limited resource availability has much higher performance, since in comparison to the Cartesian expression of the Hough transform, the object positions are not reduced to the resolution of the grid size in Cartesian space, and instead may be continuously indicated.

According to a further specific embodiment of the method for calibrating a vehicle sensor, a computation of an error in the orientation of the vehicle sensor relative to the travel axis of the motor vehicle may be carried out via an error propagation method.

According to a further specific embodiment of the method for calibrating a vehicle sensor, the calibration of the vehicle sensor may be employed continuously during travel. Continuous calibration is thus possible.

DETAILED DESCRIPTION OF EXAMPLE EMBODIMENTS

Figure 1:
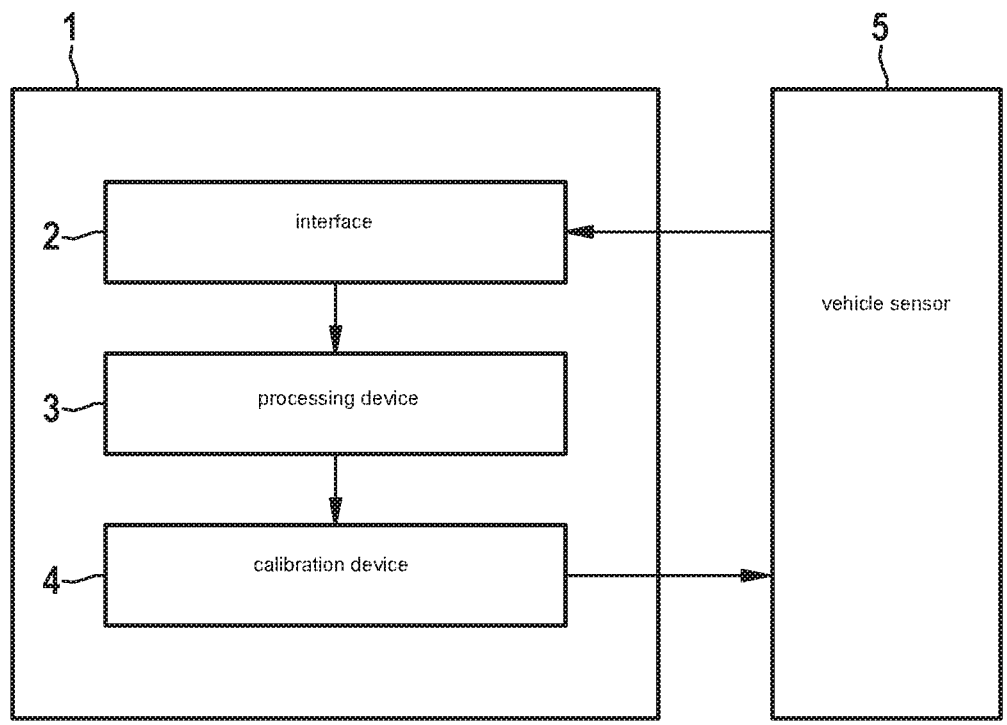
FIG. 1 shows a schematic block diagram of a device for calibrating a vehicle sensor of a motor vehicle according to one specific embodiment of the present invention.

FIG. 1 shows a schematic block diagram of a device 1 for calibrating a vehicle sensor 5 of a motor vehicle. Device 1 includes an interface 2 that is coupled to vehicle sensor 5 in order to receive sensor data from the vehicle sensor. The sensor data are generated based on measurements of vehicle sensor 5 for a plurality of measuring points in time. For example, vehicle sensor 5 may carry out measurements at predefined time intervals. Vehicle sensor 5 may be a sensor that detects the surroundings, for example a radar sensor, a LIDAR sensor, an ultrasonic sensor, an infrared sensor, or a camera sensor. During the measurements, the motor vehicle moves relative to objects in the surroundings of the motor vehicle. This is preferably a linear relative movement at constant speed, for example 5 km/h to 25 km/h. For example, the objects are fixedly positioned while the vehicle moves straight ahead at constant speed on a flat ground. In this case the travel axis corresponds to the longitudinal axis of the motor vehicle. However, in principle, accelerations or steering movements of the vehicle may also be read out by sensors and taken into account in the computation.

Device 1 also includes a processing device 3 that is coupled to interface 2 and further evaluates the received sensor data. Processing device 3 may generate a grid, having a predefined grid size, in a vehicle coordinate system of the motor vehicle. In other specific embodiments, such as for a computation in spherical coordinates, computing the grid may also be dispensed with.

Processing device 3 subdivides the total measuring time period into a plurality of partial measuring time periods. For example, the total measuring time period may be subdivided into a plurality of directly successive measuring time periods of the same length, for example. Duration T_L of the total measuring time period (800 ms, for example) thus corresponds to the sum of durations T_Kn of the partial measuring time periods (60 ms, for example), where n=1 . . . N, and N is the number of partial measuring time periods:

$$T_L = \sum_n T_{Kn}.$$

Based on the sensor data, for each partial measuring time period, processing device 3 computes object positions that indicate the position of the objects relative to the motor vehicle.

Processing device 3 computes object positions of the objects. Due to the movement of the vehicle relative to the objects, the positions of the object at various points in time are detected, so that a "flow" of the objects is ascertained. When a grid is used, each object is entered into the grid multiple times, since a particular position of the object is ascertained for each measuring point in time. The object positions may also be referred to as "locations." Multiple locations are thus associated with each object.

For each partial measuring time period, processing device 3 computes a Hough transform, for example based on the grid with the object positions for the partial measuring time period; i.e., the object positions are transformed into a dual space or Hough space. Partial measuring time period sinograms S_TKn are thus generated, i.e., one sinogram for each partial measuring time period.

Processing device 3 generates an additive sinogram S_add by adding partial measuring time period sinograms S_TKn, i.e., according to the following formula:

$$S_{add} = \sum_n S_{T_{Kn}}.$$

In addition, the processing device normalizes partial measuring time period sinogram S_TKn, and thus computes normalized partial measuring time period sinograms norm (S_TKn). "Normalizing" may be understood to mean that the particular largest value of each partial measuring time period sinogram is set to the value 1, and the other values are correspondingly scaled.

Processing device 3 computes a difference sinogram by multiplying the normalized partial measuring time period sinograms together:

$$S_{diff} = \prod_n norm(S_{T_{Kn}}).$$

The instantaneous interfering factors are also mapped in each partial measuring time period sinogram S_TKn, i.e., a "snapshot" of a brief time period. The remaining most pronounced interfering factors and surrounding structures are exponentiated in the difference sinogram. Therefore, they are maintained with a high weighting, whereas other factors are weighted very low.

Processing device 3 normalizes the difference sinogram, multiplies it by additive sinogram S_add, and subtracts the result from additive sinogram S_add in order to compute a compensated sinogram or total measuring time period sinogram S_komp:

$$S_{komp} = S_{add} - \mathrm{norm}(S_{diff}) \cdot S_{add} = S_{add} \cdot (1 - \mathrm{norm}(S_{diff})).$$

The total measuring time period sinogram thus results by adding the partial measuring time period sinograms and correcting with the aid of a factor that is a function of the partial measuring time period sinograms, the factor being expressed by:

$$1 - \mathrm{norm}(S_{diff}).$$

The determination of the main directions via a Hough transform in a Cartesian coordinate system takes place based on total measuring time period sinogram S_komp, using the following formula:

$$r\_n = \cdot \cos(\theta\_n) + y \cdot \sin(\theta\_n),$$

where r_n indicates the ordinate coordinate and θ_n indicates the abscissa coordinate of a Hough sinogram point. In addition, x and y denote the Cartesian coordinates of the object positions.

During creation of the partial measuring time period sinograms, processing device 3 may carry out a weighting of the object positions entered into the grid. The weighting factors may be computed based on quality features of the particular object positions. In particular, the weighting factors may be determined based on sensor properties of vehicle sensor 5, and are a function, for example, of a distance of the object position from the position of vehicle sensor 5.

The Hough algorithm modified by the weighting may have the following form:

```
max_d:=sqrt((image height)^2+(image width^2))

min_d:=max_d*(-1)

hough space[0 . . . π][min_d . . . max_d]:=0 for each pixel !=0 do
for α:=0 to η do d:=pixel_x*cos(α)+pixel_y*sin(α)

hough space[α][d]:=hough space[α][d]+weight
        matrix[pixel]

end
end
```

Alternatively, processing device 3 may ascertain the main direction of the object positions entered into the grid by kernel density estimation, based on total measuring time period sinogram S_komp.

Instead of computing in Cartesian coordinates, processing device 3 may compute the Hough transform in spherical coordinates, i.e., based on the following formula:

$$r\_n = (\xi\_n) = d\_R \cdot \sin(\xi\_R - \xi\_n),$$

where $\xi\_R$ denotes one of $\varphi\_R$ and $\theta\_R$. Ordinate coordinates and abscissa coordinates (r_n, $\xi\_n$) of the Hough diagram may be computed from radial distance d_R of the object position and angle $\theta\_R$ of the object position (azimuth or elevation). Corresponding to computed (r_n, $\xi\_n$) coordinates for the Hough diagram, the weightings of associated object positions (d_R, $\theta\_R$) are summed over the Hough sinogram. A quantization or classification of r_n, $\xi\_n$ that determines the resolution of the sinogram may be carried out with any desired accuracy.

Total measuring time period sinogram S_komp includes intensity values to which processing device 3 applies a threshold value function in order to compute a histogram. The histogram is a function of a possible azimuth angle or elevation angle of vehicle sensor 5 relative to the travel axis of the motor vehicle. Processing device 3 applies a filtering function to the histogram in order to ascertain a main direction of the object positions entered into the grid. The actual azimuth angle or elevation angle of vehicle sensor 5 corresponds to the angle between the main direction and the travel axis of the motor vehicle.

Device 1 also includes a calibration device 4 that is coupled to processing device 3 and calibrates vehicle sensor 5 based on the orientation of vehicle sensor 5 ascertained by processing device 3. For example, the actual orientation of vehicle sensor 5 may be taken into account for all measured values of vehicle sensor 5. In addition, it may be provided to compute an orientation error, i.e., a deviation of the computed orientation of vehicle sensor 5 from an expected orientation.

Figure 2:
FIG. 2 shows a grid with object positions for determining an azimuth orientation.

FIG. 2 shows for the purpose of illustration a grid with object positions for determining an azimuth orientation. Each depicted measuring point in the grid corresponds to a measuring signal that is associated with the spatial region in the surroundings of the motor vehicle, corresponding to the grid point, by processing device 3 based on the sensor data. The measuring points or object positions are situated on mutually parallel main directions for each object. Main direction A2 for one of the objects is depicted by way of example. The object positions along this main direction A2 correspond to measurements of the object at various measuring points in time. In addition, travel axis A1 of the motor vehicle is depicted. FIG. 2 corresponds to a view onto the vehicle from above, so that an azimuth angle β_AZ is situated between main direction A2 and travel axis A1.

Figure 3:
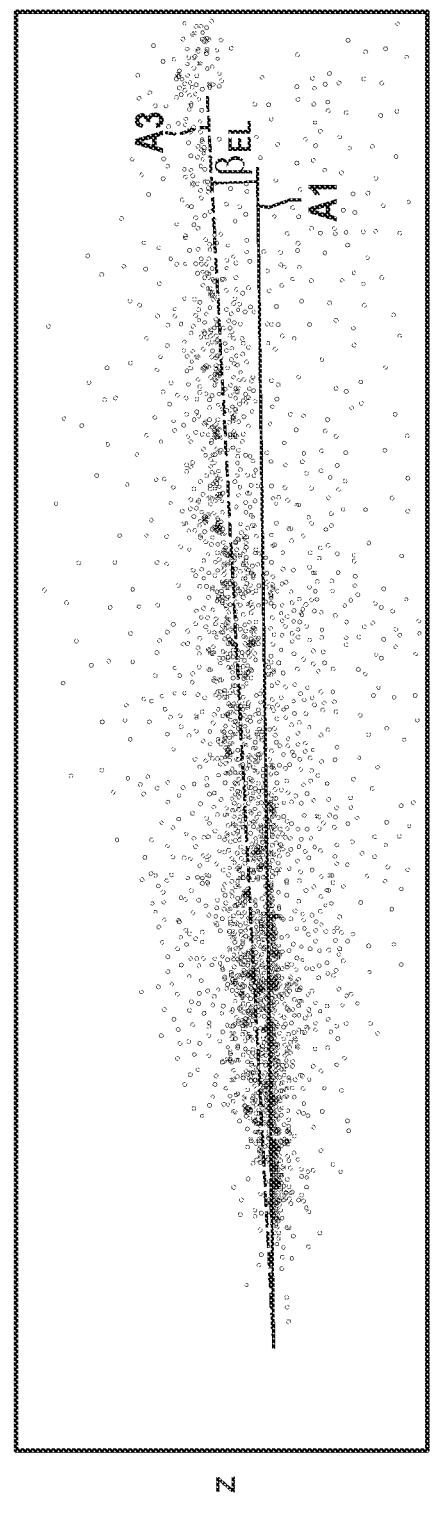
FIG. 3 shows a grid with object positions for determining an elevation orientation.

FIG. 3 shows a grid with object positions for determining an elevation orientation. FIG. 3 thus corresponds to a side view, so that an elevation angle β_EL is situated between a main direction A3 and travel axis A1.

Figure 4:
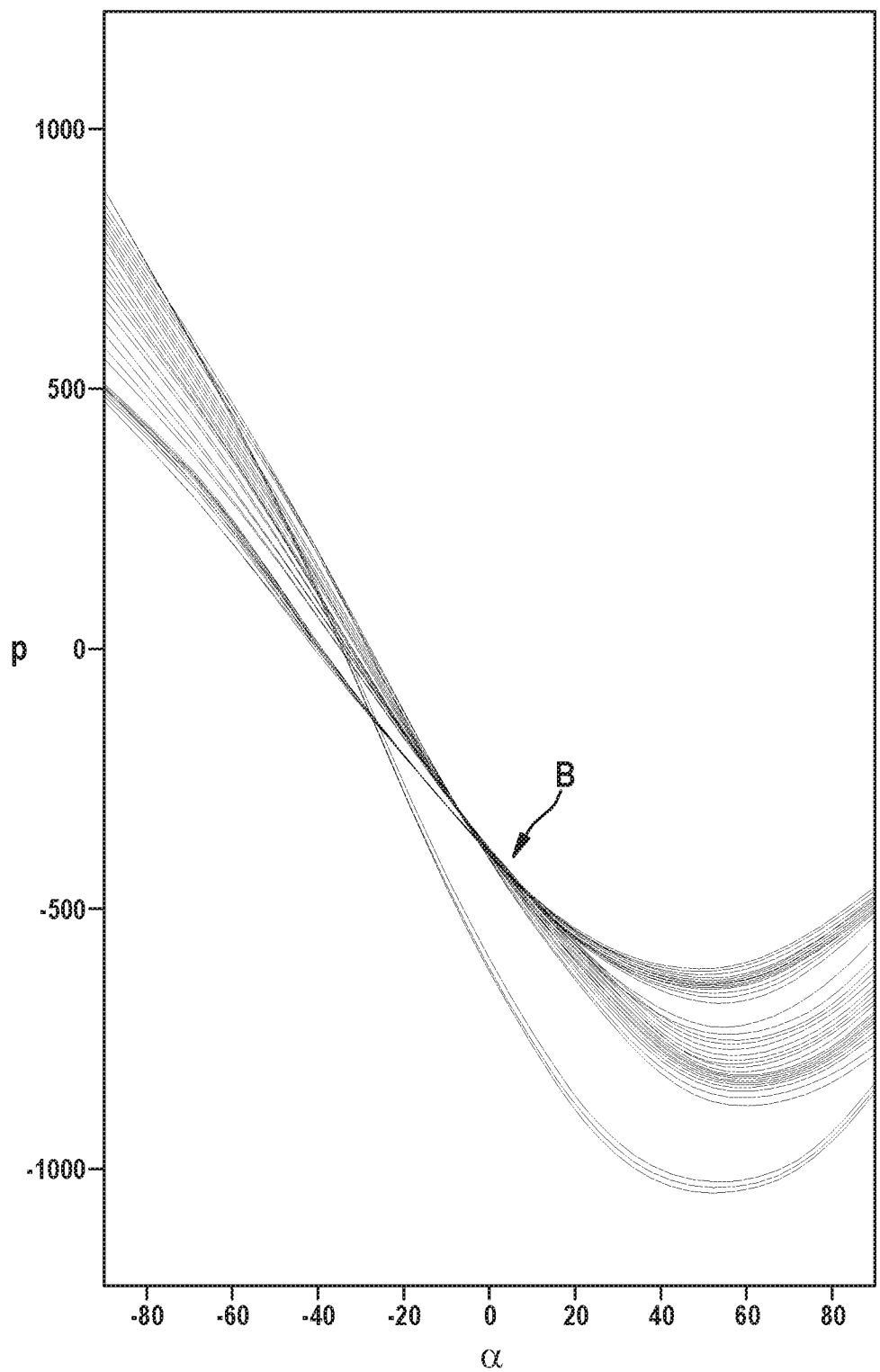
FIG. 4 shows an example of a total measuring time period sinogram.

FIG. 4 shows a total measuring time period sinogram S_komp for the case of a single object. Multiple essentially sinusoidal curves result which intersect at a point B of maximum intensity. For multiple objects, further curves shifted in parallel would result, which for each object likewise intersect at a point of maximum intensity. The total measuring time period sinogram shows projection position P as a function of an angle α, for example an elevation angle or azimuth angle. Angles α with a fairly high intensity correspond to a fairly large number of measuring points situated on the associated straight line.

Figure 5:
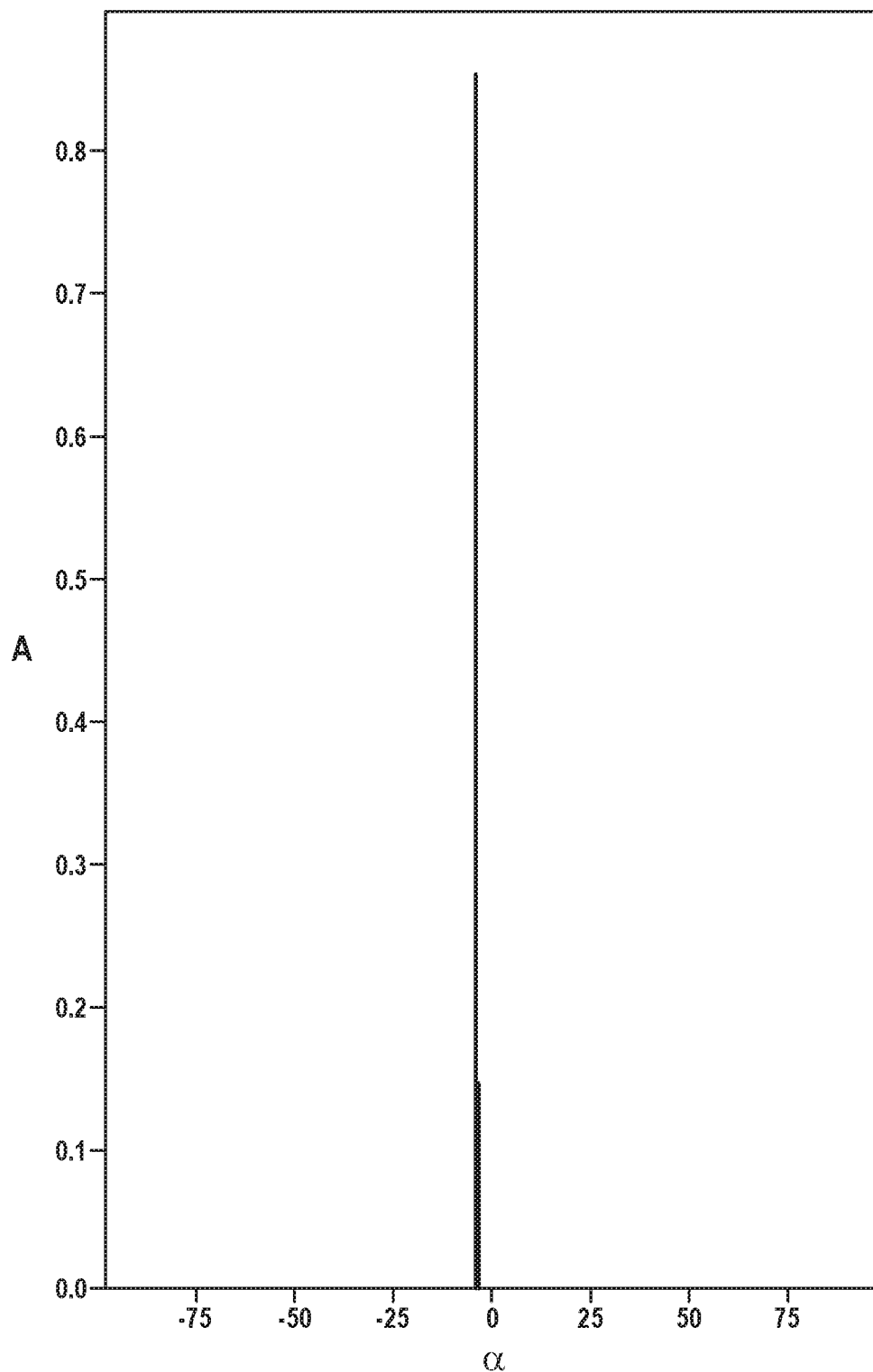
FIG. 5 shows an example of a histogram.

FIG. 5 shows an example of a histogram that is computed with application of a threshold value function to the intensity values. For each angle α the intensities are summed over all projection positions P, i.e., r_n, only points whose intensity exceeds a predefined threshold value being taken into account. For a certain angle α, the corresponding histogram results in a maximum of summed intensity A. This angle corresponds to the corresponding angle between main direction A2, A3 and travel axis A1 of the motor vehicle, for example the actual elevation angle or azimuth angle. The summed intensity or total intensity corresponds to a total weighting of associated angle α, and may be computed with the aid of a filtering function. The ascertainment of the angle may be computed using an angle estimation method, in particular a Kalman filter, an averaging method, or the like.

Figure 6:
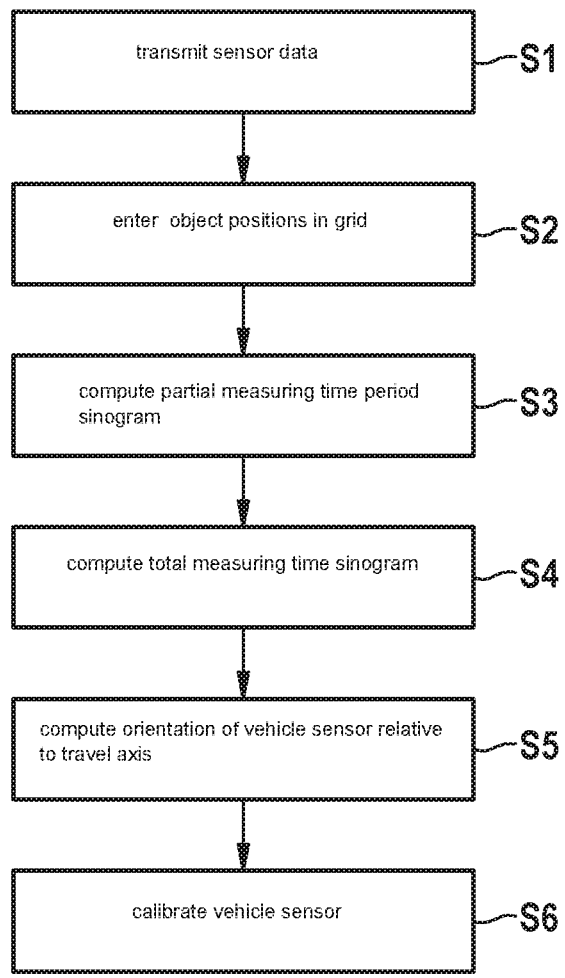
FIG. 6 shows a flowchart of a method for calibrating a vehicle sensor of a motor vehicle according to one specific embodiment of the present invention.

FIG. 6 shows a flowchart of a method for calibrating a vehicle sensor 5 of a motor vehicle according to one specific embodiment of the present invention.

A vehicle sensor 5 transmits, in a first method step S1, sensor data that are detected for a plurality of measuring points in time while the motor vehicle is moving relative to objects in the surroundings of the motor vehicle. The motor vehicle and the objects may in particular move linearly relative to each other at constant speed. The total measuring time period is subdivided into a plurality of partial measuring time periods.

For each partial measuring time period, object positions are entered into a grid in a vehicle coordinate system of the motor vehicle in a second method step S2, based on the ascertained sensor data. Each object is entered multiple times; i.e., for each measuring point in time the corresponding coordinates ("locations") are entered into the grid. In other computations, for example in spherical coordinates, generating the grid may be dispensed with.

For each partial measuring time period, a partial measuring time period sinogram is computed in a third method step S3 with the aid of a Hough transform, based on the computed object positions for the partial measuring time period. A weighting of the object positions may be carried out for this purpose. The Hough transform may be computed in Cartesian coordinates or in spherical coordinates.

A total measuring time period sinogram is computed in a fourth method step S4 by adding the partial measuring time period sinograms and correcting with the aid of a factor that is a function of the partial measuring time period sinograms. The computation may take place according to the above formulas.

An orientation of vehicle sensor 5 relative to a travel axis A1 of the motor vehicle is computed in a fifth method step S5, based on the total measuring time period sinogram. A kernel density estimation for determining a main direction may be carried out for this purpose. Alternatively, a histogram that is a function of an azimuth angle and/or elevation angle relative to the travel axis of the motor vehicle may be computed with application of a threshold value function to the intensity values of the total measuring time period sinogram. The orientation of vehicle sensor 5 relative to the travel axis of the motor vehicle is ascertained based on the computed histogram. A filtering function may be applied to the histogram.

Vehicle sensor 5 is calibrated in a sixth method step S6, based on the ascertained orientation of vehicle sensor 5 relative to travel axis A1 of the motor vehicle.

What is claimed is:

1. A method for calibrating a vehicle sensor of a motor vehicle, comprising the following steps:
    ascertaining, via the vehicle sensor, sensor data for a plurality of measuring points in time during a total measuring time period, the total measuring time period being subdivided into a plurality of partial measuring time periods, and the motor vehicle moving relative to objects in surroundings of the motor vehicle;
    for each of the partial measuring time periods, computing object positions of the objects based on the ascertained sensor data;
    for each of the partial measuring time periods, computing a partial measuring time period sinogram based on the computed object positions for the partial measuring time period;
    computing a total measuring time period sinogram by adding the partial measuring time period sinograms and by correcting using a factor that is a function of the partial measuring time period sinograms;
    ascertaining an orientation of the vehicle sensor relative to a travel axis of the motor vehicle, based on the total measuring time period sinogram; and
    calibrating the vehicle sensor based on the ascertained orientation of the vehicle sensor relative to the travel axis of the motor vehicle.

2. The method as recited in claim 1, wherein the motor vehicle and the objects in the surroundings of the motor vehicle carry out a linear relative movement at constant speed.

3. The method as recited in claim 1, wherein the correction using the factor that is a function of the partial measuring time period sinograms includes the following steps:
    normalizing the partial measuring time period sinograms; and
    computing a difference sinogram by multiplying the normalized partial measuring time period sinograms together.

4. The method as recited in claim 1, wherein a weighting of the object positions is carried out during the computing of the partial measuring time period sinograms.

5. The method as recited in claim 1, wherein a main direction of the object positions is ascertained based on the total measuring time period sinogram, using methods that determine intensity maxima, the ascertainment of the orientation of the vehicle sensor relative to the travel axis of the motor vehicle including computing an angle between the main direction and the travel axis of the motor vehicle.

6. The method as recited in claim 1, wherein the total measuring time period sinogram includes intensity values that are ascertained based on the sensor data, a histogram being computed with application of a threshold value function to the intensity values, the histogram being a function of a possible azimuth angle and/or elevation angle relative to the travel axis of the motor vehicle, and the orientation of the vehicle sensor relative to the travel axis of the motor vehicle being ascertained based on the computed histogram.

7. The method as recited in claim 6, wherein the orientation of the vehicle sensor relative to the travel axis of the motor vehicle is ascertained by applying a filtering function to the histogram.

8. The method as recited in claim 7, wherein a main direction of the object positions is ascertained by applying the filtering function to the histogram, the ascertainment of the orientation of the vehicle sensor relative to the travel axis of the motor vehicle including computing an angle between the main direction and the travel axis of the motor vehicle.

9. The method as recited in claim 1, wherein the computing of the partial measuring time period sinograms is carried out in spherical coordinates.

10. A device for calibrating a vehicle sensor of a motor vehicle, comprising:
    an interface for receiving sensor data, ascertained by the vehicle sensor, for a plurality of measuring points in time during a total measuring time period, the motor vehicle moving relative to objects in the surroundings of the motor vehicle;
    a processing device configured to:
        subdivide the total measuring time period into a plurality of partial measuring time periods,
        for each of the partial measuring time periods, compute object positions of the objects based on the ascertained sensor data,
        for each of the partial measuring time periods, compute a partial measuring time period sinogram based on the computed object positions for the partial measuring time period,
        compute a total measuring time period sinogram by adding the partial measuring time period sinograms and correcting using a factor that is a function of the partial measuring time period sinograms, and
        compute an orientation of the vehicle sensor relative to a travel axis of the motor vehicle, based on the total measuring time period sinogram; and
    a calibration device configured to calibrate the vehicle sensor based on the ascertained orientation of the vehicle sensor relative to the travel axis of the motor vehicle.

* * * * *